United States Patent [19]

Maier

[11] 4,284,045
[45] Aug. 18, 1981

[54] SIMPLIFIED ELECTRONIC IGNITION TIMING AND A/D CONVERSION

[75] Inventor: Thomas A. Maier, Apollo, Pa.

[73] Assignee: Essex Group, Inc., Fort Wayne, Ind.

[21] Appl. No.: 74,615

[22] Filed: Sep. 12, 1979

[51] Int. Cl.³ .............................................. F02P 5/04
[52] U.S. Cl. ................................................... 123/416
[58] Field of Search ......................................... 123/416

[56] References Cited

U.S. PATENT DOCUMENTS

| | | | |
|---|---|---|---|
| 4,114,573 | 9/1978 | Mori | 123/416 |
| 4,127,091 | 11/1978 | Leichle | 123/416 |
| 4,127,092 | 11/1978 | Fresow | 123/416 |
| 4,162,666 | 7/1979 | Maioglio | 123/416 |
| 4,175,506 | 11/1979 | Sakamoto | 123/416 |
| 4,178,893 | 12/1979 | Aoki | 123/416 |
| 4,220,125 | 9/1980 | Nishida | 123/416 |
| 4,231,331 | 11/1980 | Wrathall | 123/416 |

*Primary Examiner*—Ronald B. Cox

*Attorney, Agent, or Firm*—M. P. Williams

[57] ABSTRACT

A simplified electronic ignition timing system includes a pair of transducers for providing signals indicative of each cylinder-related sub-cycle of the engine and indicative of angular rotation within each cylinder sub-cycle of the engine; the angular rotation signals being converted to a speed signal which is used with a manifold pressure signal to address a table of values indicative of desired firing angle; the cylinder sub-cycle signal being utilized to preset and permit count advance of counting means responsive to the signal indicative of desired firing angle to produce a dwell signal which ends at the desired angle for the spark. In an embodiment, the pressure and speed signals are converted to digital signals for addressing a PROM. A multi-channel analog to digital converter includes a plurality of comparators and latches, one for each channel, each responsive to the analog and digital representations, respectively, of a stair step sawtooth waveform produced by an oscillator feeding a cyclic counter.

3 Claims, 4 Drawing Figures

SIMPLIFIED ELECTRONIC IGNITION TIMING AND A/D CONVERSION

TECHNICAL FIELD

This invention relates to electronic controls for determining the firing angle of spark ignition, internal combustion engines and to simplified A/D conversion apparatus.

Background Art

In spark ignition, internal combustion engines, it has long been known to adjust the timing of the spark ignition as a function of speed and as a function of engine loading. The speed function has typically been provided by centrifugal weight distributor advance, and the load function has typically been provided by intake manifold vacuum advance to the distributor. Both of these functions are capable of providing only an additive, monotonic input to the advancement of the spark. That is, the spark easily is advanced as a function of increased speed; similarly, the spark easily is advanced as a function of increased intake manifold vacuum.

With the growing concern over exhaust emission pollutants, empirical determination of optimal engine operating parameters, only one of which is firing angle, has shown that the optimum firing angle for minimum pollution as a function of speed is not independent of engine load, nor is the optimum firing angle for minimum pollution as a function of engine load (or vacuum) independent of speed. In fact, optimum angle is not simply an increasing advance in the firing angle with increasing speed and/or vacuum. To the contrary, the functions are quite complex and diatonic or triatonic in any cross section of vacuum as a function of speed or speed as a function of vacuum. Stated alternatively, there are multiple maxima and minima in the topography of the complex speed/engine load (vacuum) characteristics required for minimal pollutants in the exhaust emissions.

In order to accommodate this complex, interrelated control of firing angle as a dependent function of both speed and engine loading, the traditional mechanical vacuum and centrifugal weight advances of the distributor have been eliminated in favor of electronic controls. Generally, production vehicles using electronic controls at this time typically include a digital microprocessor which responds to values of intake manifold absolute pressure to calculate, or otherwise provide, unique values of firing angle for each unique combination of speed and manifold pressure. In some of these systems, the variable desired firing angle may be altered by other parameters, such as engine coolant temperature.

In some of the electronic firing angle calculators, the speed input is provided by means of a phase locked loop which is synchronized to the crank shaft of the engine by one means or another, thereby to provide a clock having a fixed number of pulses during each cylinder sub-cycle of an engine cycle. Such an arrangement provides clock signals which have a definite angular revolution relationship. However, devices of this type have been found to be inadequate since the phase locked loop requires at least a cycle to determine a change has been made, and may variously require one or several additional cycles in order to correct for the change in engine speed. During periods of rapid acceleration and deceleration, which are the occasions in which exhaust pollutants may be the highest, this system performs the least well. Additionally, in systems of this type, a substantial fraction of the cost and vulnerability to damage arises in the use of a microprocessor and a random access memory, together with a rather complex power supply required in order to service the processor and the RAM.

Because of this, attempts have been made to provide simplified electronic systems which do not use a programmable microprocessor, but dedicated hardware to achieve the accomplishment of a complex, desired firing angle. Examples are U.S. Pat. Nos. 4,018,197, 4,036,190 and 4,963,539. In some cases, the simplified devices have fallen short of the mark because they simply add firing angle factors determined from speed to firing angle factors determined from manifold absolute pressure, and therefore are incapable of providing the complex profiles required. In a sense, these are simply electronic variations on the old flyweight and vacuum advance techniques known to the prior art. In one such circuit, the engine crank shaft angle is recognized only on a cylinder by cylinder basis, speed is measured during one period and utilized during a subsequent period. Therefore, this system is also unresponsive during rapid acceleration and deceleration, which are typically accompanied by a high degree of pollutant in the exhaust emissions. In other simplified devices, the resolution of change in firing angle as a function of manifold pressure and/or speed may be too gross to accommodate the necessary complex profile for minimizing pollutants in exhaust emissions. In still others, the duplicate use of hardware results in an inherent cyclic delay which is undesirable as described hereinbefore with respect to the phase locked loop.

Disclosure of the Invention

Objects of the invention include provision of simplified apparatus for electronically determining firing angle of spark ignition, internal combustion engines with a complex profile dependent upon mutually related speed and engine loading, and provision of simplified conversion apparatus useful in low cost electronic controls.

According to a first aspect of the present invention, a multi-channel analog to digital converter of the type which compares an analog input signal with an analog conversion of a cyclically varying digital signal is provided with multiple channels by means of a plurality of comparators, each controlling a corresponding latch, each latch capable of registering the cyclically varying digital signal in dependence upon the analog version thereof comparing with the respective analog input signal. The multiple channel digital to analog converter in accordance with this aspect of the invention is useful in low cost electronic circuitry, such as electronic firing angle control systems for spark ignition, internal combustion engines.

According to another aspect of the present invention, apparatus for controlling the firing angle of a spark ignition, internal combustion engine, operative only in engine angle domain, includes means for providing a signal indicative of desired firing angle in response to inlet manifold pressure and engine speed, and means operative in response to signals indicative of cyclic and sub-cyclic angular rotation of the engine to provide a signal determining and end of the dwell period corresponding to said desired firing angle. In accordance with this aspect of the invention, digital representations of intake manifold pressure and of engine speed, derived from an element of the engine rotating with the crank shaft thereof, cooperatively address a bifunctional lookup table, the output of which comprises a function of the desired firing angle, which is used to determine the end of a dwell period, which causes the spark to occur. According further to this aspect of the invention, the digital function of speed is derived from sensing the passage of teeth on the flywheel (or equivalent) and developing an analog signal, the magnitude of which is a function of the speed at which teeth are being sensed. In accordance still further with this aspect of the invention, the desired firing angle is achieved by using the indication thereof from a lookup table to preset counting means at a time related to a cylinder cycle, said counting means being advanced by the digital signals indicative of sub-cyclic engine speed, the overflow of which causes the spark.

The firing angle control system of the present invention eliminates any need for any microprocessor, random access memory, or other critical or expensive components; it may be implemented utilizing relatively few, low cost circuit components, such as the multi-channel analog to digital converter referred to hereinbefore; and it is totally asynchronous, eliminating the need for a processing philosophy, interrupts, or any complex digital clocking arrangements.

The foregoing and other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
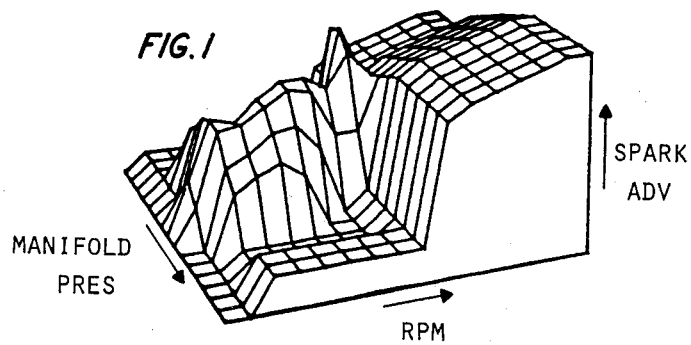
FIG. 1 is an illustration of desired firing angle as a complex function of both speed and intake manifold pressure.

As has been described hereinbefore, optimum firing angle for minimal pollutants in the exhaust emissions of a spark ignition internal combustion engine is a very complex function of both speed and engine loading, the engine loading being typically manifested by intake manifold pressure (which either can be absolute pressure above zero or can be measured in terms of vacuum below atmospheric pressure). Such a complex function, which has been simplified slightly to permit portrayal, is illustrated roughly in FIG. 1. Reference to FIG. 1 illustrates the fact that modern firing angle control circuits must provide other than simple increases in the advance of the firing angle as a function of increases in speed and as a function of decreases in manifold pressure.

Figure 2:
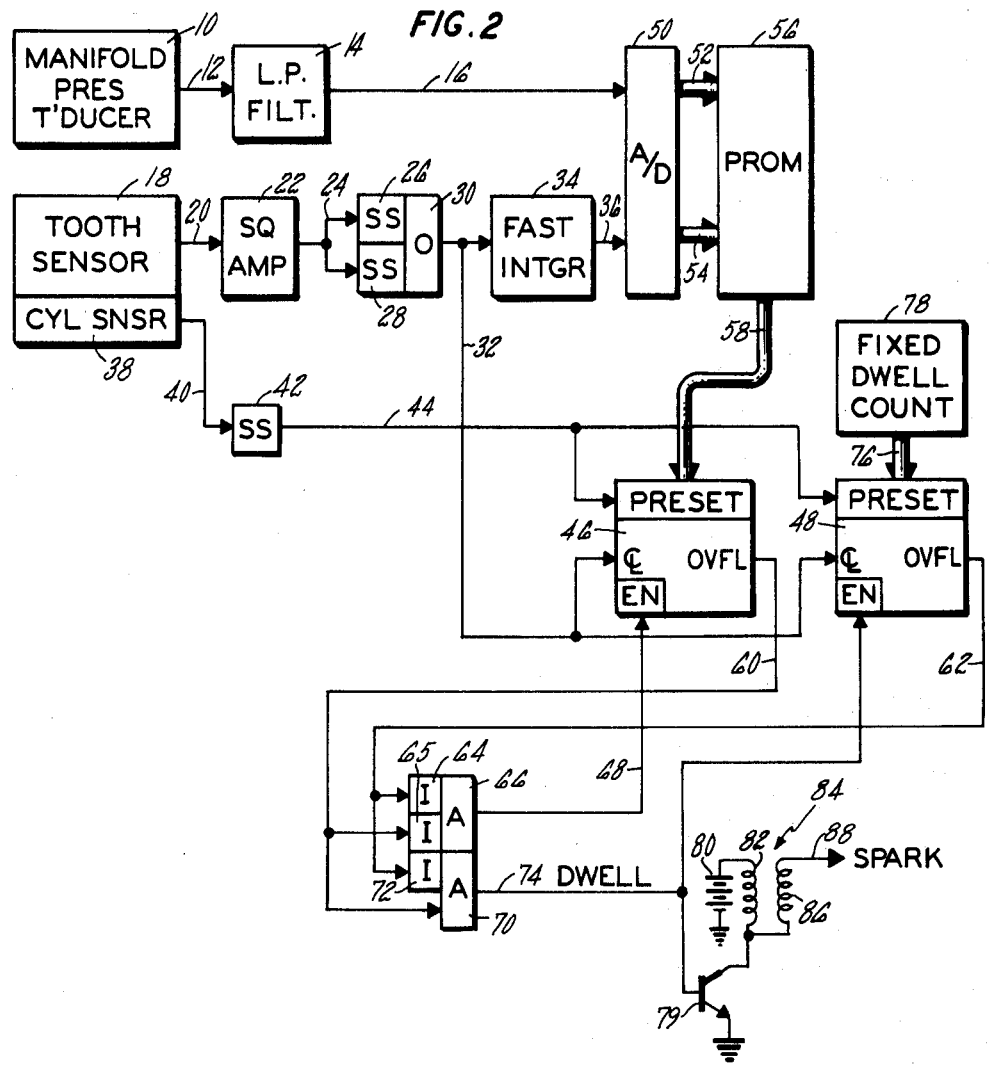
FIG. 2 is a schematic block diagram of an exemplary embodiment of the present invention.

Referring now to FIG. 2, a firing angle control system in accordance with the present invention employs a manifold pressure transducer 10 of any suitable known variety, the output of which is applied on a line 12 to a low pass filter 14, so as to eliminate noise and other undesirable spurious effects, to provide an analog manifestation of engine loading (manifold pressure) on a line 16.

A tooth sensor 18 provides signals indicative of the passage of teeth on the flywheel. It may comprise any suitable known reluctance transducer or the like, to provide a substantially sinusoidal wave on a line 20. In order to provide a signal responsive to the speed of flywheel teeth at a frequency equal to twice the number of teeth per revolution, for greater resolution, both the negative and positive swings of the wave on the line 20 are recognized. This is achieved by passing the wave 20 through a squaring amplifier 22 (which may be a high gain, hard-limited amplifier) to provide a square wave having the same phase and frequency as the wave produced by the tooth sensor 18. The square wave is provided on a line 24 to a pair of single shots 26, 28 which are responsive to opposite polarity, so that both phases of the square wave produce pulses combined in an OR circuit 30, to provide a train of angular increment pulses on a line 32 (referred to herein as tooth signals) in phase with the teeth (or other indicia) being sensed by the sensor 18, and at a frequency which is twice as great, thereby providing twice as much sensible resolution. The tooth signals on the line 32 are applied to an integrator 34, which has a relatively fast time constant, so as to be able to follow the frequency of the pulse train, thereby to provide a varying DC signal on a line 36, the magnitude of which is a function of the rotational speed of the engine.

A similar sensor, referred herein as a cylinder sensor 38, is disposed to sense the occurrence of gross angular revolution corresponding to each cylinder-related sub-cycle of the engine. For instance, in a four cylinder, four stroke engine, the cylinder sensor 38 will sense two events in each revolution of the engine. This may be achieved by having protuberances disposed 180° apart from each other. In the present case, it is assumed they are disposed that 10° in advance of top dead center for each cylinder; the purpose of this, as is known, is that the 10° advance may be harnessed with emergency backup circuitry to run the engine with degraded performance, in the event that the electronic system fails; this forms no part of the present invention, and such backup circuitry is not shown herein. The cylinder sensor 38 may include a suitable interface and signal conditioning (not shown). Its output on a line 40 operates a single shot 42 so as to provide a shaped pulse of a desired duration on a line 44 which is utilized to control the time at which a pair of counters 46, 48 will respond at their preset inputs, as is described more fully hereinafter, thereby to define a variable pre-dwell period and a fixed dwell period.

The signal on the line 16 provides an indication of engine loading, and the signal on the line 36 provides an indication of engine speed. These signals are both converted in A/D conversions means 50 to provide respective digital indications on trunks of lines 52, 54 for application to the address inputs of a read only memory 56 which stores a map of the desired firing angle as compound function of both engine loading and speed. The memory 56 is preferably of the programmable type (PROM) to facilitate use in different vehicle models. The data within the PROM 56 may be laid out in a fashion that is reflected in FIG. 1, as described hereinbefore, to provide an indication of desired spark firing angle as a function of speed and load. The output of the PROM 56 on the trunk of lines 58 is applied to the presets of the counter 46. Counter 46 is responsive only during the presence of the signal on the line 44. The signals on the line 58 are continuously changing since all of the apparatus which controls the PROM is operating in a "flush" fashion at all times. However, by causing the single shot 42 to provide a pulse of a suitable duration, in contrast with the rate at which data is changing, undesirable signal erases can generally be avoided. If not, in any implementation of the present invention, a signal delayed from the signal on the line 44 may be utilized to prevent data from changing at the output of the PROM during the preset operation. All of this is within the skill of the art, and not essential to the present invention.

The output of the PROM 56 on the line 58, expressing the desired firing angle, may be in a form representing the desired firing angle expressed as the number of pulses on line 32 (twice the number of teeth) within that angle of revolution of the flywheel of the engine, as delayed from the 10° advance indicated by the signal on the line 44. Therefore, when the signal on the line 44 allows presetting of the counters 46, 48 forcing their states to other than an overflow condition, signals on lines 60, 62 connected to the overflow terminals of the counters 46, 48 will disappear. With both of these signals gone, a pair of inverters 64, 65 are operated which allow an AND circuit 66 to produce an enable signal on a line 68, which is connected to the clock enable input of the counter 46. This allows the train of signals on the line 32 to clock the counter 46 and it will count down (or up, depending upon the counter which is selected in a given implementation of the invention) until the counter reaches zero (or maximum count), producing the overflow signal on the line 60. When this happens, the AND circuit 66 becomes blocked, and an AND circuit 70 which is responsive to the signal on the line 60 and responsive to an inverter 72 which in turn senses the absence of a signal on a line 62, will generate a dwell signal on a line 74 which is applied to the clock enable input of the counter 48. The counter 48 is attached by lines 76 to a register 78 (which may, in some cases, simply comprise hard wiring) so that when the signal on the line 44 presets both of the counters 46, 48, the counter 48 represents the equivalent counts of teeth on the line 32 equal to a fixed angle which is desired for the dwell period (the period in which the coil is energized, at the end of which the spark will be generated). The train of pulses on the line 32, indicating the passage of flywheel teeth, clocks the counter 48 and when it overflows, a signal appears on the line 62 which blocks the inverter 72 from operating the AND circuit 70, so the dwell signal on the line 74 disappears. The dwell signal on the line 74 not only enables counting through the dwell period, it also is connected to the base of a suitable transistor (or the equivalent) which provides a connection from the low end of the coil to ground (in the same manner as breaker points in mechanical ignition systems) to allow current to build up from a battery 80 through the primary winding 82 of the high voltage ignition coil 84. The signal on the line 74 is present from the time that the first counter overflows until the time that the second counter overflows, which is defined as the dwell period. Thus, it enables the transistor 79 to maintain current in the primary 82 during that same period of time. When the signal on the line 74 disappears, the transistor 79 is cut off, so that there is a high voltage buildup in the secondary winding 86 of the high voltage coil 84, which produces a high voltage on the high voltage coil output line 88, in a well known manner. This is typically applied to the distributor for successive application to the correct spark plugs relating to corresponding cylinders to advance the firing of the engine.

Note that utilization of the cylinder signal on the line 44, which is generated at a known angular relationship with respect to top dead center of each cylinder, both as a preset for the two counters (thus to establish the subcycles of operation), and derivatively to remove the overflow signals 60, 61 which in turn are used to define the beginning and end of the dwell period, provides additional simplification of the circuitry, avoiding the need for special timing circuits to control this apparatus.

Figure 3:
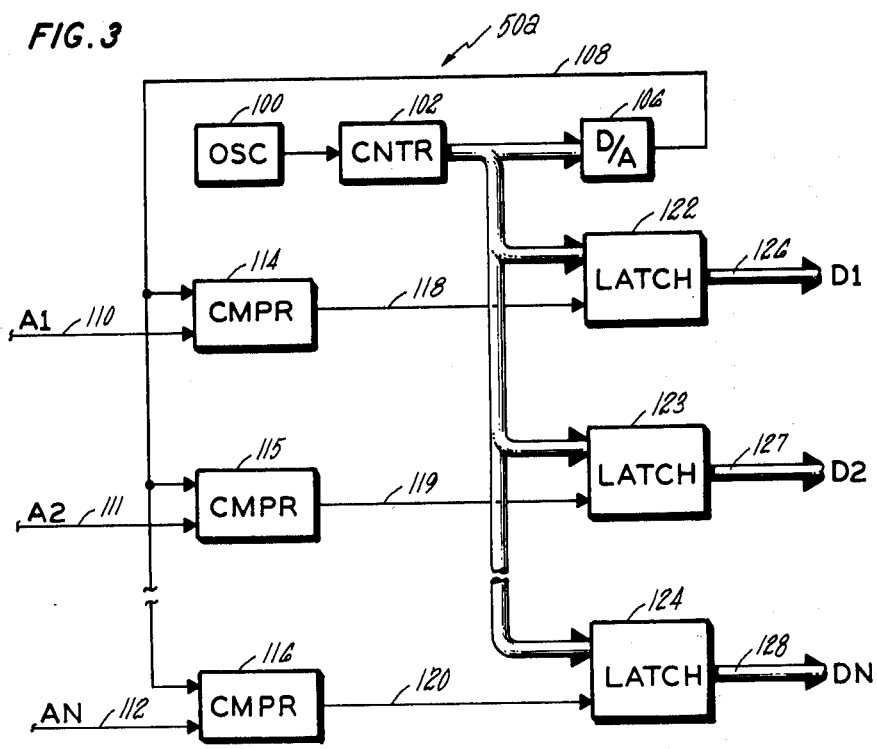
FIG. 3 is a simplified schematic diagram of a multi-channel analog to digital coverter in accordance with the present invention.

The multi-channel A/D converter 50 referred to with respect to FIG. 2 may, for the purposes of implementing a spark advance control in accordance with the invention, take any form, or it may take the form in accordance with the D/A converter 50a of the invention illustrated in FIG. 3. Referring now to FIG. 3, an oscillator 100 drives a counter 102 which advances from zero to a maximum count (such as 256) to provide digital signals on lines 104 which advance from zero through the maximum count of the counter and back to zero again, and thereby represents stair stepped, sawtooth waves over a period of time, depending upon the frequency of the oscillator 100. The digital signals on the line 104 are applied to a digital to analog converter 106 of any suitable, simple form, such as a ladder network commonly used in the art, to produce a summation voltage including weighted voltage components for each digital signal. The D/A converter produces a signal on a line 108 which is an analog equivalent of the digital signal on the lines 104. This therefore represents a sawtooth going from minimum to maximum value at the frequency of the oscillator as divided by the counter 102. In order to convert a plurality of analog input signals A1, A2 . . . AN on corresponding lines 110-112, each is connected to a corresponding compare circuit 114-116 along with the analog signal on the line 108. Whenever the analog signal on the line 108 reaches a value equal to the corresponding analog input signal, the related comparator 114-116 provides an output signal on a related line 118-120 which is utilized to edge-gate a corresponding latch 122-124, each of which is connected to the digital signals on the lines 104. Thus, at the time that the comparator produces a signal to operate a latch, the digital signal on a line 104 is equal to the analog signal which has compared equally with the corresponding analog input signal. In this fashion, each latch will be set, during each rise of the sawtooth, at the time when the correct digital value is present on the lines 104. Each of the latches 122-124 provides a corresponding digital output on a plurality of related lines 126-128. Thus, many signals can be connected with only one set of oscillator 100, counter 104, and D/A converter 108.

In the spark ignition angle system of the invention illustrated in FIG. 2, utilization of the multi-channel A/D converter 50a of FIG. 3 is accomplished by providing two comparators and two latches, so that the signal line 16 (FIG. 1) corresponds to the line 110 (FIG. 2), the line 36 (FIG. 2) corresponds to the line 111 (FIG. 3), the lines 52 (FIG. 2) correspond to the lines 126 (FIG. 3) and the lines 54 correspond to the lines 127 (FIG. 3). On the other hand, the electronic ignition angle controls system of FIG. 2 could use independent A/D converters, or other circuits in any given implementation thereof. Similarly, a multi-channel A/D converter 50a of the invention can obviously be used in a wide range of applications where useful. Similarly, the A/D converter 50a may be implemented in a format using both up and down count slopes, which tends to cancel certain types of errors, and in other configurations which should be obvious to those skilled in the art.

Figure 4:
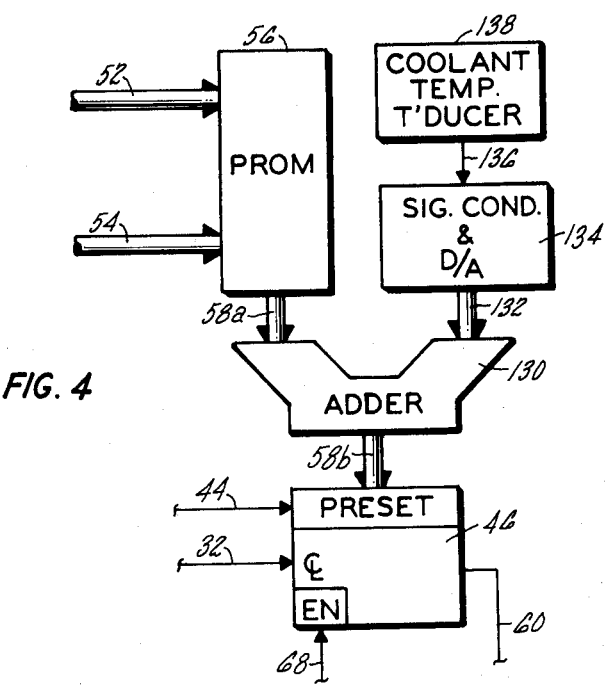
FIG. 4 is a partially broken away block diagram illustrating the manner of providing an additional input to the firing angle control system of the invention.

In additional control inputs (such as engine temperature) are desired to modify the firing angle, the embodiment of the invention illustrated in FIG. 2 may be modified as shown briefly in FIG. 4. In FIG. 4, the output of the PROM 56 on lines 58a may be connected to an adder 130, the other input of which is connected to digital lines 132 provided by circuits 134 which condition and digitize an analog signal on a line 136 from a coolant temperature transducer 138, which may be of any known form suitable for the application herein. The output of the adder 130 is applied on lines 58b to the preset input of the counter 46. In this fashion, any portion of the load/speed firing angle map can be increased or decreased as a function of temperature. For example, the angle may be increased from any angle on the map when the engine is extremely cold, thereby to enhance operation during equivalent lean mix, which occurs when the air fuel mixture is entering the engine at a low temperature. Other inputs, inputs relating to other parameters, and other apparatus may also be used in an analogous fashion which should be evident in the light of the teachings herein. For example, the circuitry 134 may in fact comprise, at least in part, the comparator 116 and latch 124 illustrated in FIG. 3 and consist of a third channel in the A/D converter 50a.

The roles of the two counters may be reversed by applying a fixed preset to counter 46 and applying the PROM to counter 48, and by ORing the enable signals on the lines 68 and 74 to operate the transistor 79. This will place the fixed dwell period ahead of a variable dwell period, instead of the variable pre-dwell period followed by the fixed dwell period of FIG. 2. Instead of using two counters, a single counter could be utilized which is provided with a count having the fixed dwell period added to the angular count. If a single counter is used with a large number provided by the PROM, the coil must be energized at a fixed time at or near the start of each cylinder cycle so that this single number will ensure an adequate dwell time as well as determine the shutoff time. Another variant may use a single counter, by allowing the PROM 56 to provide the variable angle for the start of the dwell period, and by adding the fixed dwell count to it, in a fashion analogous to that shown in FIG. 4, for countdown in a single counter. And, a configuration as shown in FIG. 2, using a single counter 46 to first count down the variable count, at which time the counter 46 is again preset, but with the fixed dwell count, with suitable toggling from one state to the other in each cycle, may be implemented using techniques which are known in the art in the light of the teachings herein. The embodiment of FIG. 2 is preferred for most utilizations because it has the smallest PROM and the least amount of control circuitry. Memory 56 may be an unprogrammable ROM. The foregoing variations are irrelevant to the invention, which is using the preset of counting means, in response to a signal timed to cylinder TDC, to count indications of engine angle derived directly from the engine, to time-out a firing angle determined by at least load and engine speed.

The embodiment of FIG. 2 may also be manifested in a variety of ways. For instance, the counters have been described as being preset with values and counting down to an overflow. On the other hand, they could be preset with values that would allow counting up to terminal count to provide the overflow signals on the lines 60, 62. Although the embodiment of FIG. 2 is described as utilizing a tooth sensor responsive to the teeth on the flywheel of an engine, the invention may be practiced utilizing other means for providing a relatively large number of pulses indicative of angular rotation of the angle in each revolution thereof, such as various forms of timing discs or the like which may be disposed for rotation with the crank shaft of the engine, such as on the flywheel or damper of the engine. It is contemplated in this embodiment that the cylinder sensor 38 is similarly disposed to sense protuberances on the crank shaft; however, this signal may be derived elsewhere, such as from the damper or any encoding device capable of indicating the cylinder sub-cycle of the engine. The logic circuits responsive to overflow signals to control the counter enabling signals and the spark system may be implemented in other, though functionally equivalent formats. Similarly, the particular spark system being controlled, which is described herein as including a bipolar transistor, may instead be implemented with complex circuitry (such as Darlington's) or field effect transistors or the like. The utilization of the dwell signal to control the dwell period and the timing of the spark is the essential aspect.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

I claim:

1. Electronic spark timing angle apparatus for a spark ignition, internal combustion engine, comprising:

means for providing cylinder signals indicative of the occurrence of each cylinder-related sub-cycle of the engine;

means for providing engine angle signals delineating angular rotation of the engine within each cylinder-related sub-cycle of engine rotation, said engine angle signals indicating angles of rotation which are much smaller than the angles of rotation related to each cylinder-related sub-cycle of the engine;

means operative in response to inlet manifold pressure of the engine for providing pressure signals indicative of engine loading;

means for providing firing angle signals indicative of the desired spark firing angle as a function of engine speed and load in response to said pressure signals and a time function of said engine angle signals indicative of rotary speed of the engine; and counting means responsive to said firing angle signals, said cylinder signals, and said engine angle signals for counting a particular number of said engine angle signals which occur subsequent to each of said cylinder signals, said particular number in each case being determined by said firing angle signals, and for providing an end of dwell signal indicating the time of occurrence of the desired firing angle in response to completion of counting of said particular number of angle signals;

characterized by said counting means including a pair of presettable counters, each having preset inputs, a preset enable input connected to said cylinder signals, a clock input connected to said angle signals, a clock enable input and an overflow output; and logic means responsive to both of said overflow outputs and connected to both of said clock enable inputs to enable a first one of said counters to be clocked by said angle signals only between presetting of both of said counters and the completion of counting in said first counter as indicated by a signal at the overflow output of said first counter, and to enable said second counter go be clocked by said angle signals only between completion of count of said first counter and completion of count of said second counter as indicated by signals at both said overflow outputs.

2. Apparatus according to claim 1 in which one of said counters has its preset inputs connected to said firing angle signals and the other of said counters has its preset inputs connected to a source of signals representing a fixed angle, thereby to divide the total delay angle from the occurrence of each of said cylinder signals to the occurrence of said end of dwell signal into a fixed angle portion and a variable angle portion.

3. Apparatus according to claim 2 wherein the preset inputs of said first counter are connected to said firing angle signals, thereby to provide a variable pre-dwell portion, followed by a dwell portion, the duration of which is fixed, but the time of occurrence of which is varied so as to vary the timing of said end of dwell signal.

* * * * *